(12) United States Patent
Yoshimoto

(10) Patent No.: US 7,355,931 B2
(45) Date of Patent: Apr. 8, 2008

(54) OPTICAL DISC CENTER ERROR AMPLITUDE CALIBRATION

(75) Inventor: Ainobu Yoshimoto, Milpitas, CA (US)

(73) Assignee: LSI Logic Corporation, Milpitas, CA (US)

( * ) Notice: Subject to any disclaimer, the term of this patent is extended or adjusted under 35 U.S.C. 154(b) by 553 days.

(21) Appl. No.: 10/915,232

(22) Filed: Aug. 10, 2004

(65) Prior Publication Data
US 2006/0044973 A1 Mar. 2, 2006

(51) Int. Cl.
*G11B 7/00* (2006.01)

(52) U.S. Cl. ................. 369/44.29; 369/53.23

(58) Field of Classification Search ............... None
See application file for complete search history.

(56) References Cited

U.S. PATENT DOCUMENTS

| | | | |
|---|---|---|---|
| 5,101,391 A * | 3/1992 | Ishii et al. ............... | 369/44.29 |
| 5,708,636 A * | 1/1998 | Takahashi et al. ....... | 369/44.29 |
| 5,914,925 A * | 6/1999 | Lee et al. ................ | 369/44.41 |
| 6,728,173 B2 * | 4/2004 | Shimano et al. ......... | 369/44.35 |
| 2004/0136282 A1 * | 7/2004 | Chen ....................... | 369/44.35 |

* cited by examiner

*Primary Examiner*—William Korzuch
*Assistant Examiner*—Peter Vincent Agustin
(74) *Attorney, Agent, or Firm*—Christopher P. Maiorana P.C

(57) ABSTRACT

A method for calibrating a center error signal in an optical disc system, comprising the steps of (i) measuring a peak-to-peak value of the center error signal, (ii) computing a nominal peak-to-peak value of the center error signal after locking to a particular track of an optical disc, (iii) computing the nominal peak-to-peak value of the center error signal for a run-out condition, and (iv) defining a calibration gain for the current value for the center error signal.

16 Claims, 4 Drawing Sheets

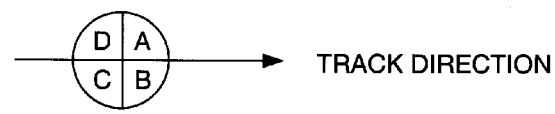 TRACK DIRECTION
FIG. 1
(CONVENTIONAL)
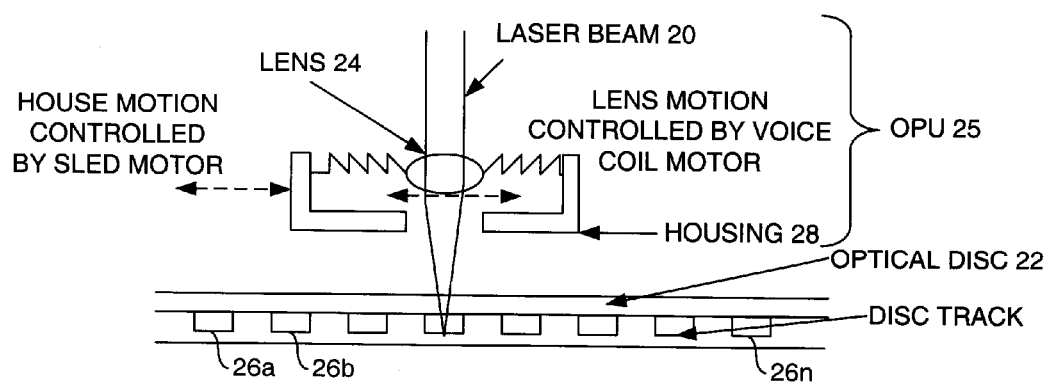
FIG. 2
(CONVENTIONAL)

OPTICAL DISC CENTER ERROR AMPLITUDE CALIBRATION

FIELD OF THE INVENTION

The present invention relates to optical storage generally and, more particularly, to a method and/or apparatus for center error amplitude calibration in an optical disc system.

BACKGROUND OF THE INVENTION

In a conventional optical disc system, to sense the position of the laser beam in relation to the track on the disc, the main laser beam creates a reflection from the disc. The reflection is typically picked up by 4 photo-diode sensors. FIG. 1 is a conceptual diagram illustrating how such a photo-diode configuration is laid out in relation to the track direction. The outputs of the 4 photo-diodes (when the laser beam is focused on the disc) are shown as signals A, B, C and D, respectively.

To control the position of a main laser beam 20 on the disc 22, the position of the objective lens 24 of the Optical Pickup Unit (OPU) 25 related to the track 26a-26n on the optical disc 22 is controlled by a voice coil motor. The OPU 25 is a device configured to emit a laser beam and pick up the optical reflection of the laser beam. The OPU 25 converts such reflections to electrical signals. The position of the lens 24 and a housing 28 of the OPU 25 are controlled by a sled motor (not shown) which moves the whole OPU 25. FIG. 2 illustrates the motion of the OPU 25 and the lens 24.

To direct the laser beam 20 to a particular track of the optical disc 22, or to cross some of the tracks 26a-26n of the optical disc 22, the voice coil motor and the sled motor are controlled at the same time. The voice coil motor controls the position of the lens 24 in relation to the optical disc 22, while the sled motor controls the position of the lens 24 in relation to the lens housing 28. Various conventional approaches are used to control the position of the lens 24 in relation to the lens housing 28. One conventional control approach is based on the center error signal CE. Such a conventional approach has positive characteristics such as improving the balance of two sides of the signals A and D versus the signals B and C of the main beam when the laser beam 20 stays on track. Also, such an approach can control the position of the objective lens 24 inside the OPU 25 to avoid hitting the lens 24 against the lens housing 28.

While such an approach may be effective on certain discs, with certain other discs (e.g., from a different manufacturer, a different fabrication run, etc.), a different reflection will result in a different amplitude for the center error signal CE. The different amplitude will potentially disturb the center control loop and potentially degrade control quality. In the worst case, the different value can create instability of the control loop.

It would be desirable to provide a method and/or apparatus to ensure quality of the center control of a closed-loop system by calibrating the amplitude of the control error signal.

SUMMARY OF THE INVENTION

The present invention concerns a method for calibrating a center error signal in an optical disc system, comprising the steps of (i) measuring a peak-to-peak value of the center error signal, (ii) computing a nominal peak-to-peak value of the center error signal after locking to a particular track of an optical disc, (iii) computing the nominal peak-to-peak value of the center error signal for a run-out condition, and (iv) defining a calibration gain for the current value for the center error signal.

The objects, features and advantages of the present invention include providing method and/or apparatus for calibrating an optical disc system that may (i) provide center error amplitude calibration and/or (ii) be implemented in hardware and/or software.

BRIEF DESCRIPTION OF THE DRAWINGS

These and other objects, features and advantages of the present invention will be apparent from the following detailed description and the appended claims and drawings in which:

FIG. 1 illustrates a photo-diode sensor distribution system;

FIG. 2 illustrates a lens and a lens housing in relation to a position of a laser beam;

DETAILED DESCRIPTION OF THE PREFERRED EMBODIMENTS

Figure 3:
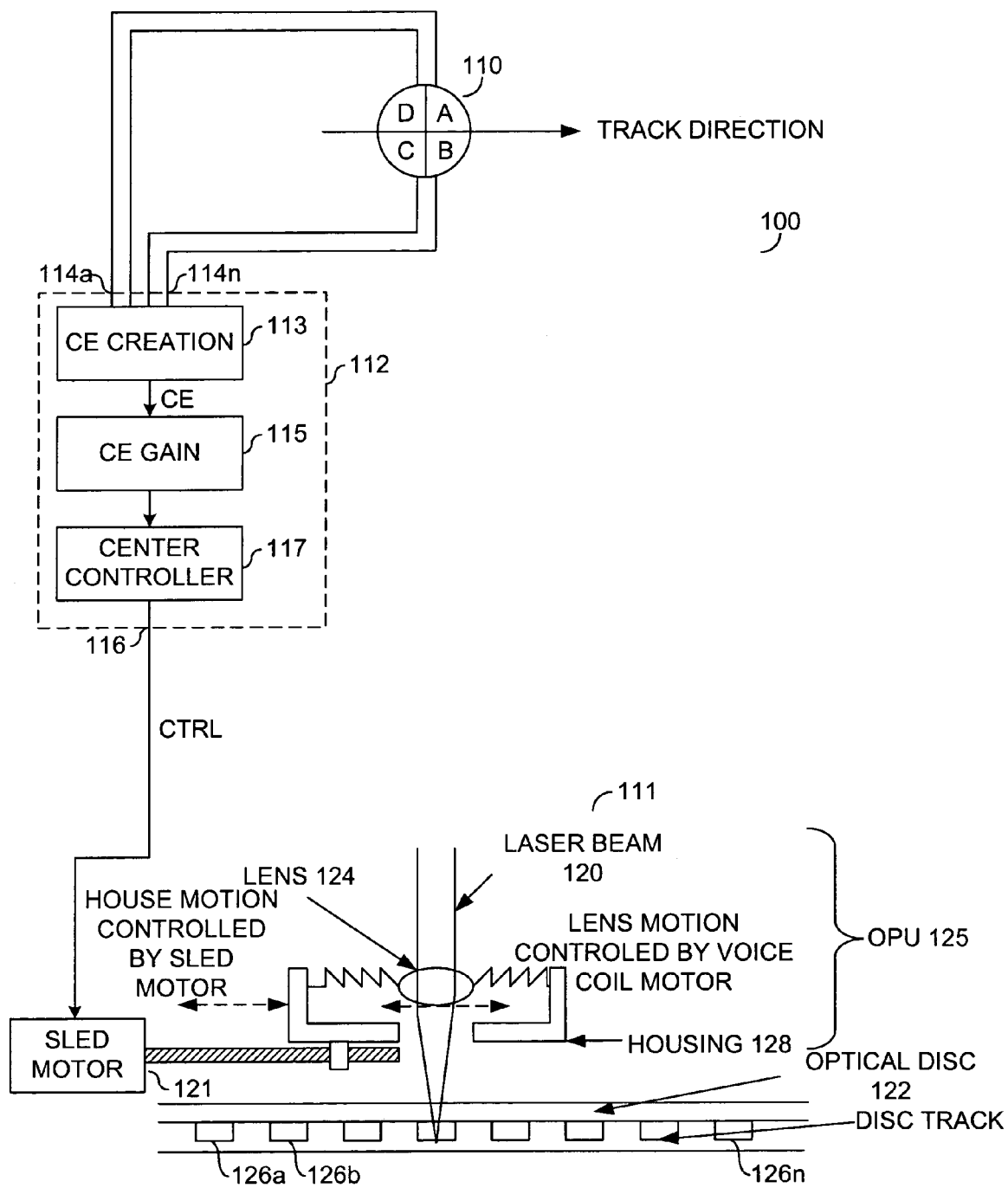
FIG. 3 is a diagram of a system incorporating the present invention.

Referring to FIG. 3, a diagram of a system 100 illustrating the present invention is shown. The system 100 generally comprises a photo-diode distribution portion 110 and a lens housing portion 111. The photo-diode system 110 generally has output signals (or photo-diode signals) A, B, C and D that are generally presented to a number of inputs 114a-114n of a control circuit 112. The control circuit generally comprises a creation circuit 113, a gain circuit 115 and a center controller 117. The creation circuit 113 may be implemented as a center error (CE) creation circuit. The gain circuit may be implemented as a center error (CE) gain circuit. The center error signal CE is normally passed through the calibrated gain block 115 for calibration before being passed to the controller block 117. The control block 112 has an output 116 that presents a control signal (e.g., CTRL) that controls a sled motor 121. The lens housing 111 generally comprises a laser pick-up 120, an optical disc 122, a lens 124, an OPU 125 and a housing 128. The optical disc 122 has a number of disc tracks 126a-126n.

Figure 4:
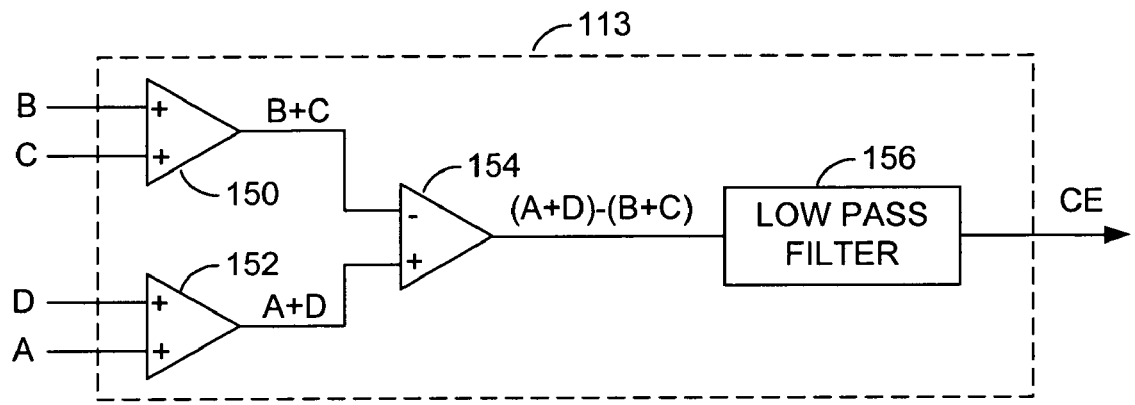
FIG. 4 is a diagram of the creation circuit of FIG. 3.

Referring to FIG. 4, a more detailed diagram of the CE creation circuit 113 is shown. The CE creation circuit generally comprises a circuit 150, a circuit 152, a circuit 154 and a circuit 156. The circuit 150 and the circuit 152 may be implemented as summing circuits. The circuit 154 may be implemented as a differential circuit (e.g., a comparator, etc.). The circuit 156 may be implemented as a low pass filter. In general, the circuit 150 receives the signal B and the signal C and presents a signal equal to B+C. Similarly, the circuit 152 receives the signal A and the signal D and presents an output signal equal to A+D. The differential circuit 154 receives the signal B+C and the signal A+D and presents a signal equal to (A+D)−(B+C). The signal (A+D)−(B+C) is presented to the low pass filter 156, which generates the signal CE.

Figure 5:
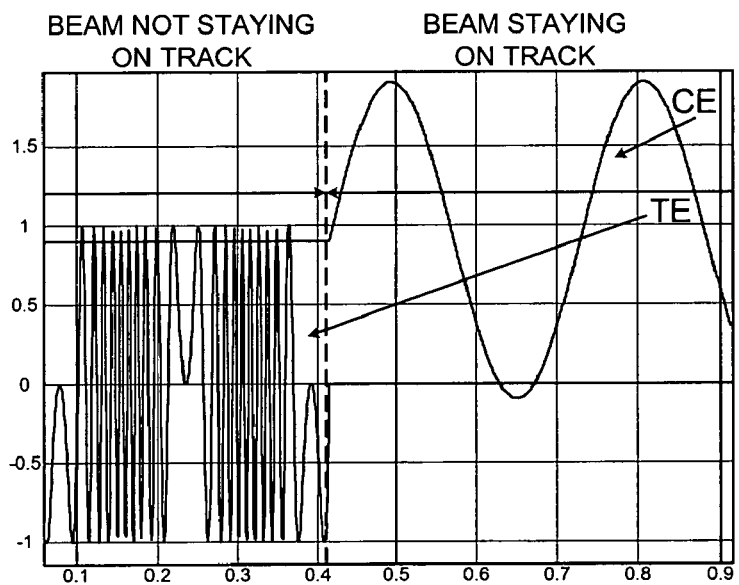
FIG. 5 is a diagram illustrating a tracking error signal and a center error signal.

Referring to FIG. 5, a diagram of a tracking error signal (e.g., TE) and the center error signal CE in accordance with a preferred embodiment of the present invention is shown.

FIG. 5 illustrates the tracking error signal TE and the center error signal CE when a laser beam 120 is not staying on the same physical track 126a-126n and when the laser beam 120 is staying on a particular one of the tracks 126a-126n as the disc 122 is rotating. A typical optical disc system 100 has a plurality of tracks 126a-126n that may be randomly accessed in response to input received from an end user. Without such inputs, a typical optical system 100 plays the disc tracks 126a-126n sequentially with the peak to peak amplitude of the center error signal CE depending on the reflectivity of the disc and the disc eccentricity (sometimes called a disc run-out).

The tracking error signal TE is a signal created by either a differential phase detecting (DPD) method or a differential push pull (DPP) method. With the DPD method, the difference in phase of two signals (A+C) and (B+D) is used to create the signal TE. In the DPP method, the difference in value of two signals (A+D) and (B+C) is used to create the signal TE. Either method detects the position of the laser beam 120 in relation to the tracks 126a-126n on the disc 122. When the signal TE is properly generated, if the laser beam 120 is staying (or "locked") on a particular one of the physical tracks 126a-126n, then the signal TE will not change in value. If the laser beam 120 is moving across the tracks 126a-126n, then the signal TE will vary from peak to bottom. The center value of this variation will be the value of the signal TE when the beam is staying on a particular one of the tracks 126a-126n. A comparison of the signal TE and the signal CE (i) when the laser beam is not staying on track and (ii) when the laser beam is staying (or "locked") on track, is illustrated in FIG. 5.

When using the signal CE as an input signal to control and keep the position of an objective lens 124 within the center of the lens housing 128, the reflection of the laser beam 120 on different optical discs 122 is different. Such differences create different amplitudes of the signal CE, although the position of the objective lens 124 and lens housing 128 are the same and the disc eccentricity (or disc run-out) is the same. To achieve the same signal CE through different reflections so the feedback control quality is stable, the present invention calibrates the signal CE.

Figure 6:
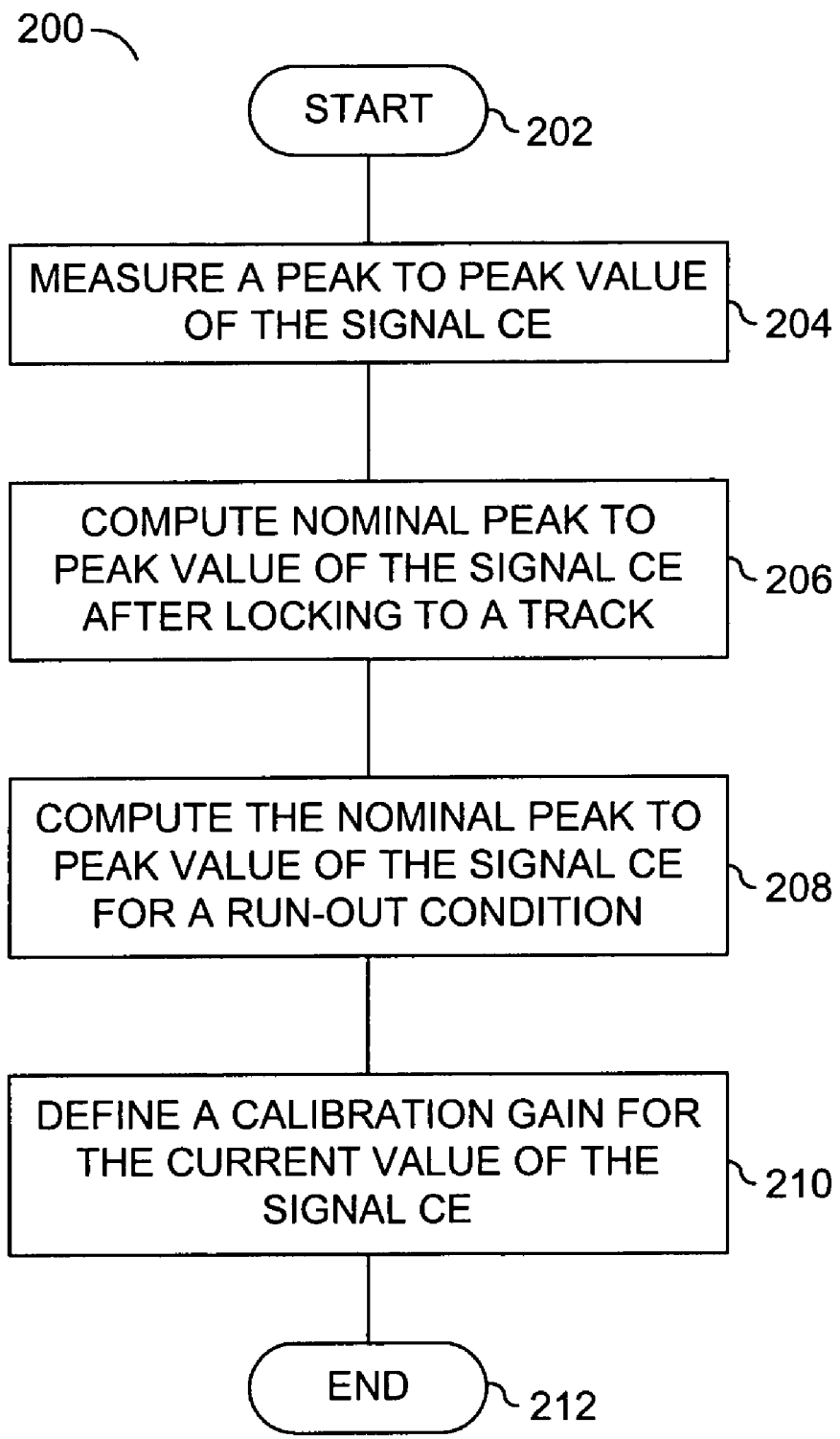
FIG. 6 is a flow diagram of a process of an embodiment of the present invention.

Referring to FIG. 6, a method 200 for calibrating the signal CE is shown. The method 200 generally comprises a state (or step) 202, a state (or step) 204, a state (or step) 206, a state (or step) 208, a state (or step) 210 and a state (or step) 212. The state 202 generally comprises a start state. The state 204 is configured to measure the peak-to-peak value of the signal CE. The state 206 is configured to compute the nominal value of the peak-to-peak value of the signal CE after locking to a particular track on a disc. The state 208 generally comprises computing a nominal value of the peak-to-peak value of the signal CE for a run-out value. The state 210 generally comprises defining a calibration gain for the current value for the signal CE. The state 212 generally comprises an end state.

The state 202 measures the disc run-out value before the beam 120 stays on track. When the laser beam 120 is not staying on one of the tracks 126a-126n, and there is no control output to any motor, because of the disc eccentricity during rotation, although the lens 124 stands still, the lens will "see" the tracks on discs as "moving" back and forth. This phenomenon shows in the tracking error signal TE as changes from peak to bottom with a frequency changing from slow to fast, and vice versa (illustrated in FIG. 5). The tracking error signal TE will continue to change in frequency and will change phase after the disc rotates one revolution.

The number of these "peaks" in the tracking error signal TE during one revolution of the disc is defined as disc run-out value. Each track crossing will normally cause one peak. The disc run-out value can be measured based on the frequency and phase change in the tracking error signal TE or as a combination with the disc rotation measurement. The disc run-out value may be defined as N, and may be measured as a number of tracks.

The state (or step) 206 measures the peak-to-peak value of the signal CE after the beam locks to a track without center control. In general, the step 206 measures a peak-to-peak value of the signal CE after the laser beam locks on to a track. The step 206 normally measures the peak-to-peak value without center control and in the first few rotations ($1^{st}$, $2^{nd}$, $3^{rd}$ rotations, etc.) of the disc 122 and takes an average value. A signal Vpp may be defined as the peak-to-peak value of the signal CE after locking to a particular one of the tracks 126a-126n without center control.

The state (or step) 208 computes the nominal value of the peak-to-peak value Vpp for the above disc run-out value. A nominal value of the peak-to-peak value of the signal CE when disc run-out value has the nominal value (e.g., No) may be defined as Vo. The nominal value (e.g., Vn) of the peak-to-peak value of the signal CE will be defined as:

$$Vn=Vo*N/No$$

The state (or step) 210 defines a calibration gain for the current value of the signal CE. From the above results, the signal CE received after locking track will need to be corrected by a gain K defined as:

$$K=Vn/Vpp$$

The calibrated CE signal will become:

$$CE(\text{calibrated})=K*CE(\text{measured})$$

A present invention has new features such as (i) calibration of a center error signal based on the disc run-out value and a peak-to-peak value after the laser beam locks on track, and (ii) detecting the proper adjustment of the center error signal CE within the first few rounds of disc rotation after the beam stays on track.

The present invention may (i) be implemented in hardware/firmware or totally by firmware and (ii) ensure quality of center control using center error signal CE. The present invention may control the laser beam to be on track or to move across tracks of the optical disc.

The function performed by the flow diagram of FIG. 6 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAS, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMS, RAMS, EPROMs, EEPROMS, Flash memory, magnetic or optical cards, or any type of media suitable for storing electronic instructions.

The present invention may be applied for all types of CD optical discs (e.g., CD-ROM, CD-R, CD-RW, etc.) as well as DVD optical discs (e.g., DVD-ROM, DVD-R, DVD-RW, DVD+R, DVD+RW, etc.).

While the invention has been particularly shown and described with reference to the preferred embodiments thereof, it will be understood by those skilled in the art that various changes in form and details may be made without departing from the spirit and scope of the invention.

The invention claimed is:

1. A method for calibrating a center error signal in an optical disc system, comprising the steps of:
    (A) measuring a peak-to-peak value of said center error signal;
    (B) computing a nominal peak-to-peak value of the center error signal after locking to a particular track of an optical disc;
    (C) computing said nominal peak-to-peak value of the center error signal for a run-out condition; and
    (D) generating a calibration gain for a current value of said center error signal in response to said peak-to-peak value and said nominal peak-to-peak value, wherein said calibration gain compensates for different disc reflections to provide stability to said center error signal.

2. The method according to claim 1, wherein said optical disc comprises a plurality of tracks.

3. The method according to claim 1, wherein said run-out condition comprises a number of peaks of a tracking error signal.

4. The method according to claim 3, wherein said tracking error signal is generated using differential phase detection.

5. The method according to claim 3, wherein said tracking error is generated using differential push pull.

6. A computer readable medium comprising code executable on a computer, said code configured to execute the steps of claim 1.

7. The method according to claim 6, wherein said computer readable medium comprises firmware.

8. The method according to claim 1, wherein said method is implemented in hardware.

9. The method according to claim 1, wherein said method is implemented partially in hardware and partially in firmware.

10. The method according to claim 1, wherein said calibration gain is calculated within an initial number of rotations of said optical disc.

11. An apparatus for calibrating a center error signal in an optical disc system comprising:
    means for measuring a peak-to-peak value of said center error signal;
    means for computing a nominal peak-to-peak value of the center error signal after locking to a particular track of an optical disc;
    means for computing said nominal peak-to-peak value of the center error signal for a run-out condition; and
    means for generating a calibration gain for a current value of said center error signal in response to said peak-to-peak value and said nominal peak-to-peak value, wherein said calibration gain compensates for different disc reflections to provide stability to said center error signal.

12. The apparatus according to claim 11, wherein said apparatus is implemented in hardware.

13. The apparatus according to claim 11, wherein said apparatus is implemented partially in hardware and partially in firmware.

14. The apparatus according to claim 11, wherein said calibration gain is calculated within an initial number of rotations of said optical disc.

15. An apparatus comprising:
    a sled motor configured to adjust a position of an optical housing in an optical disc system in response to a control signal;
    a control circuit configured to generate said control signal in response to a plurality of photo-diode signals; and
    a photo-diode distribution portion configured to generate said photo-diode signals, wherein said control circuit comprises
    (a) a center error creation circuit configured to generate a center error signal in response to said photo-diode signals;
    (b) a gain circuit configured to calibrate said center error signal; and
    (c) a control circuit configured to generate said control signal in response to said calibrated center error signal, wherein said calibration of said center error signal is configured to compensate for different disc reflections to provide stability to said center error signal.

16. The apparatus according to claim 15, wherein said calibration of said center error signal occurs within an initial number of rotations of an optical disc.

* * * * *